United States Patent

Teglia

(10) Patent No.: US 9,710,650 B2
(45) Date of Patent: Jul. 18, 2017

(54) PROTECTION OF DATA STORED IN A VOLATILE MEMORY

(71) Applicant: STMicroelectronics (Rousset) SAS, Rousset (FR)

(72) Inventor: Yannick Teglia, Belcodene (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 91 days.

(21) Appl. No.: 14/668,692

(22) Filed: Mar. 25, 2015

(65) Prior Publication Data

US 2015/0356300 A1   Dec. 10, 2015

(30) Foreign Application Priority Data

Jun. 10, 2014 (FR) ................................. 14 55257
Jun. 10, 2014 (FR) ................................. 14 55258

(51) Int. Cl.
| | |
|---|---|
| G06F 21/57 | (2013.01) |
| G06F 12/14 | (2006.01) |
| G06F 21/55 | (2013.01) |
| G01K 13/00 | (2006.01) |
| G06F 21/71 | (2013.01) |

(52) U.S. Cl.
CPC ........... *G06F 21/575* (2013.01); *G01K 13/00* (2013.01); *G06F 12/1458* (2013.01); *G06F 21/554* (2013.01); *G06F 21/71* (2013.01); *G06F 2212/1052* (2013.01); *G06F 2221/034* (2013.01); *G06F 2221/2137* (2013.01)

(58) Field of Classification Search
CPC ...... G06F 21/575; G06F 21/71; G06F 21/554; G06F 12/1458; G06F 2221/034; G06F 2221/2137; G06F 2212/1052; G01K 13/00
See application file for complete search history.

(56) References Cited

U.S. PATENT DOCUMENTS

| | | | |
|---|---|---|---|
| 6,330,668 B1 | 12/2001 | Curiger et al. | |
| 8,719,666 B2* | 5/2014 | Marinet | G06F 21/73 714/769 |
| 2009/0096495 A1 | 4/2009 | Keigo | |
| 2012/0006122 A1 | 1/2012 | Aitken | |
| 2012/0079593 A1 | 3/2012 | Adams et al. | |
| 2014/0215613 A1* | 7/2014 | Kelley | G06F 21/86 726/23 |

(Continued)

FOREIGN PATENT DOCUMENTS

| | | |
|---|---|---|
| FR | 2 974 648 A1 | 11/2012 |
| WO | 2011/018414 A2 | 2/2011 |

OTHER PUBLICATIONS

Michael Gruhn, Tilo Muller "On the praticability of cold boot attacks", International Conference on Availability, Reliability and Security, 2013, IEEE, pp. 391-397.*

(Continued)

*Primary Examiner* — Catherine Thiaw
(74) *Attorney, Agent, or Firm* — Seed IP Law Group LLP

(57) ABSTRACT

A method of detecting a cold-boot attack on an integrated circuit including the steps of: transferring, into a first volatile memory of the integrated circuit, a pattern stored in a non-volatile memory of the circuit; periodically causing a switching down and a switching up of the first volatile memory; and verifying that the number of bits having switched state is within a range of values.

26 Claims, 4 Drawing Sheets

(56) References Cited

U.S. PATENT DOCUMENTS

2016/0239663 A1* 8/2016 Healy .................. G06F 21/554

OTHER PUBLICATIONS

J. A. Halderman, S.D. Schoen, N. Heninger, W. Clarkson, W. Paul, J. A. Calandrino, A. J. Feldman, J. Appelbaum, and E.W. Felten "Lest we remember: cold boot attacks on encryption keys", Proceedings USENIX Security Symposium, 2008, pp. 1-16.*
Patrick Simmons: "Security through amnesia: a software-based solution to the cold boot attack on disk encryption", ACSAC, Dec. 5-9, pp. 73-82, 2011, Orlando, Florida, CM.*
Franco et al., "Ring Oscillators as Thermal Sensors in FPGAS: Experiments in Low Voltage," IEEE, 2010, pp. 133-137. (6 pages).
Müller, "Keepers of the Codes," *Pictures of the Future*, Fall 2005, p. 39.

* cited by examiner

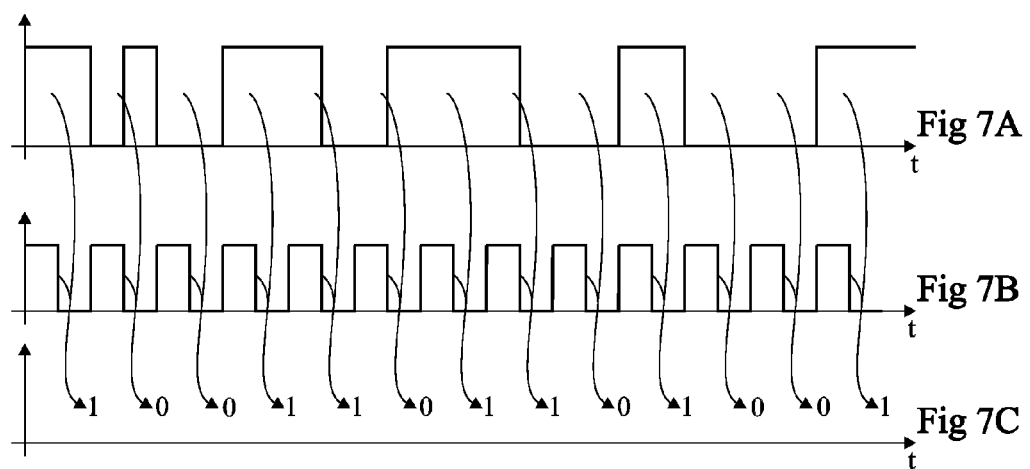
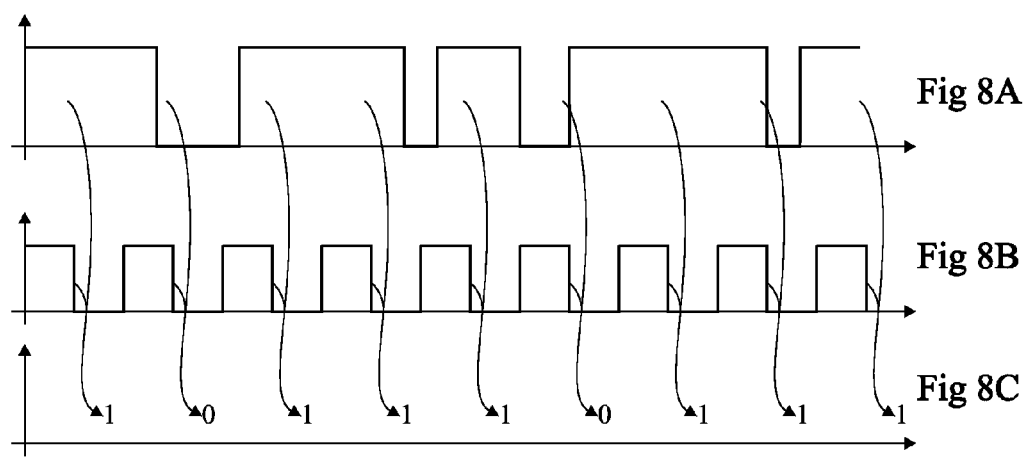

PROTECTION OF DATA STORED IN A VOLATILE MEMORY

BACKGROUND

Technical Field

The present disclosure generally relates to electronic circuits and, more specifically, to circuits containing elements storing data in non-volatile fashion. The present disclosure, for example, may apply to integrated electronic systems (System On Chip).

Description of the Related Art

As soon as an electronic system manipulates digital data, the data are typically at least temporarily stored in elements of the electronic circuits. These typically are RAM-type volatile storage elements, or registers or flip-flops storing binary data when they are being processed by the electronic circuit.

In principle, these data disappear when the integrated circuit is no longer powered. Actually, they do not really disappear, but the state that they represent is no longer reliable on restarting of the circuit.

In circuits manipulating digital data considered as secret, that is, that can only be accessed by authorized users or circuits, it should be ascertained that the data volatilely manipulated by an integrated circuit are no longer accessible in storage elements for applications other than authorized applications. Areas of the RAM assigned to such applications are thus generally reserved. Such a reservation is however dynamic, that is, it disappears at the circuit switching down or resetting. It should thus be ascertained that the data contained in previously-reserved areas are no longer accessible, for example, after a restarting of the electronic system. Indeed, even if the circuit switching down makes the data non-reliable, they are capable of containing, even partially, secret information. A first step of resetting the volatile memory elements is thus provided at the switching up of an electronic circuit, by erasing the memory at the switching up. Such a technique takes time.

BRIEF SUMMARY

In an embodiment, a method of detecting an attack on an integrated circuit, comprising: transferring, into a first volatile memory of the integrated circuit, a pattern stored in a non-volatile memory of the circuit; periodically causing a switching down and a switching up of the first volatile memory; and verifying that the number of bits which have switched state is within a range of values. According to an embodiment, the pattern is reloaded into the first volatile memory before each switching down. According to an embodiment, the pattern is selected so that said number of bits which switch state varies according to the integrated circuit temperature. According to an embodiment, said range of values is determined by statistical analysis of the states taken by the bits of the first volatile memory in successive switch up operations during a training phase.

According to an embodiment, information to be protected is contained in a second volatile memory, separate from the first one.

In an embodiment, an integrated circuit comprises: a first volatile memory; a non-volatile memory; and circuitry configured to implement a method disclosed herein.

According to an embodiment, the circuit further comprises a second volatile memory, separate from the first one and containing information to be protected against attacks by successive operations of switching up and cooling of the integrated circuit.

According to an embodiment, the circuit further comprises a control circuit causing, each time the integrated circuit is initialized, a transfer of said pattern from the non-volatile memory to the first volatile memory.

In an embodiment, a method comprises: transferring, into a first volatile memory of an integrated circuit, a pattern stored in a non-volatile memory of the integrated circuit; and periodically, switching down and switching up the first volatile memory; generating an indication of a number of switched bits in the first volatile memory; and generating an indication of a cold-boot attack based on the indication of the number of switched bits. In an embodiment, the pattern is reloaded into the first volatile memory before each switching down. In an embodiment, the pattern is selected so that said number of bits which switch state varies according to the integrated circuit temperature. In an embodiment, the generating the indication of the cold-boot attack comprises determining whether the indication of the number of switched bits is within a range of values. In an embodiment, said range of values is determined by statistical analysis of the states taken by the bits of the first volatile memory in successive switch up operations during a training phase. In an embodiment, the generating the indication of the number of switched bits comprises counting at least one of: a number of bits in a first state; and a number of bits in a second state different from the first state. In an embodiment, the generating the indication of the number of switched bits comprises at least one of: comparing the number of bits in the first state to one or more threshold values; and comparing the number of bits in the second state to one or more threshold values.

In an embodiment, a device comprises: a first volatile memory; a non-volatile memory; and cold-boot detection circuitry configured to: transfer a pattern stored in the non-volatile memory to the first volatile memory; and periodically, switch down and switch up the first volatile memory; generate an indication of a number of switched bits in the first volatile memory; and generate an indication of a cold-boot attack based on the indication of the number of switched bits. In an embodiment, the pattern is reloaded into the first volatile memory before each switching down. In an embodiment, the pattern is selected so that said number of bits which switch state is an indication of a temperature of the device. In an embodiment, the cold-boot attack detection circuitry is configured to determine whether the indication of the number of switched bits is within a range of values. In an embodiment, the cold-boot detection circuitry comprises a counter. In an embodiment, the cold-boot detection circuitry is configured to count at least one of: a number of bits in a first state; and a number of bits in a second state different from the first state. In an embodiment, the device comprises an integrated circuit including the first volatile memory, the non-volatile memory and the cold-boot detection circuitry. In an embodiment, the integrated circuit includes a second volatile memory different from the first volatile memory and the second volatile memory is configured to, in operation, store protected data.

In an embodiment, a system comprises: a processing unit; a first volatile memory; a non-volatile memory; and cold-boot detection circuitry configured to: transfer a pattern stored in the non-volatile memory to the first volatile memory; and periodically, switch down and switch up the first volatile memory; generate an indication of a number of switched bits in the first volatile memory; and generate an indication of a cold-boot attack based on the indication of the number of switched bits. In an embodiment, the cold-boot attack detection circuitry is configured to determine whether the indication of the number of switched bits is within a range of values. In an embodiment, the cold-boot detection circuitry comprises a counter. In an embodiment, the system comprises an integrated circuit including the first volatile memory, the non-volatile memory and the cold-boot detection circuitry. In an embodiment, the integrated circuit includes a second volatile memory different from the first volatile memory.

BRIEF DESCRIPTION OF THE DRAWINGS

FIGS. 7A to 7C and 8A to 8C illustrate the operation of the detection circuit of FIG. 6.

DETAILED DESCRIPTION

Figure 1:
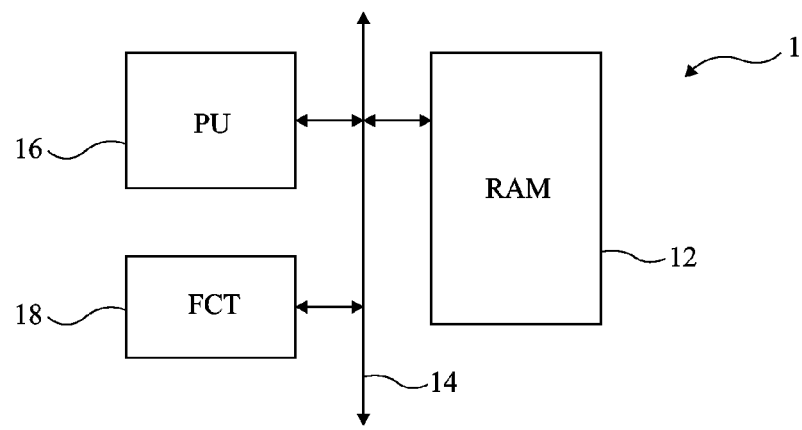
FIG. 1 is a block diagram of an example of an electronic circuit of the type to which the embodiments which will be described apply.

The same elements have been designated with the same reference numerals in the different drawings. For clarity, only those steps and elements which are useful to the understanding of the embodiments which will be described have been shown and will be detailed. In particular, the structure of a volatile memory has not been detailed, the described embodiments being compatible with usual structures and characteristics of such memories and volatile storage elements. Further, the circuits and electronic systems comprising volatile storage elements having a content which needs protection have not been detailed either, the described embodiments being here again compatible with usual circuits and systems.

FIG. 1 schematically shows in the form of blocks an example of an integrated electronic circuit comprising a volatile memory 12 having a content which is desired to be totally or partially protected. This memory is connected by one or a plurality of data, address, and control buses 14 to different electronic circuits of system 1. For example, at least one processing unit 16 (PU) is capable of using memory 12 to temporarily store manipulated data therein. Other circuits of the electronic system may also need access to memory 12. In FIG. 1, these other circuits or functions have been illustrated by a block 18 (FCT).

Memory 12 stores different data manipulated by the different circuits, and particularly by processing unit 16. In applications where the electronic circuit manipulates secret quantities, be they data or algorithms, one or a plurality of areas of memory 12 are dedicated to such so-called secure applications. To achieve this, on starting of the circuit or when it is initialized, processing unit 16 or a unit dedicated to the memory (memory management unit, for example) configures rights of access to these areas of memory 12 and, for example, reserves the access of certain areas to programs authorized to manipulate the secret data.

A problem which arises is the vulnerability of the data stored in the volatile memory to attacks by resetting of the circuit. Indeed, when the circuit is switched down and back up, an interruption of the protected area configuration process or of the RAM reset process may provide access to the secret data processed before the resetting.

An example of this type of attack is known as "Cold Boot" since they often come along with a cooling of the integrated circuit to slow down the reset process.

Such attacks are generally performed repeatedly, that is, the attacker successively turns the integrated circuit off and on with a short delay (so that the memory does not have time to reset).

The inventor has discovered that, for a same cell content in a volatile memory, this content would statistically mainly take the same values after a switching down and back up. In other words, based on a pattern stored in a memory area, a pattern related thereto, or a proportion of states 0 and of states 1, can be found in the memory content after each resetting. It is then possible to determine the pattern or the proportion of states 0 and of states 1 that the memory will take after the storage of the first pattern and the successive reset operations. Pattern means a set of binary states contained in the concerned memory area.

According to an embodiment, it is provided to dedicate to the detection of cold boot type attacks a volatile memory separated from the memory storing the critical data, for example, of a size smaller than the size of the volatile memory used by the circuit.

According to an embodiment, it is provided to use a ring oscillator to detect an attack of cold boot type. The inventor has indeed observed that the reproducibility of the successive output states of a flip-flop sampling an output of such an oscillator is similar to that of a pattern in a volatile memory. A difference however is that the pattern is native in the case of a ring oscillator.

In both cases, it is started by determining, in a preparatory or training phase, the value or the proportion of states taken by the dedicated memory or the oscillator output after sudden resets. Such a determination then enables, in an operational phase, to compare the value or the proportion of states, for example, periodically, to detect a possible attack.

Figure 2:
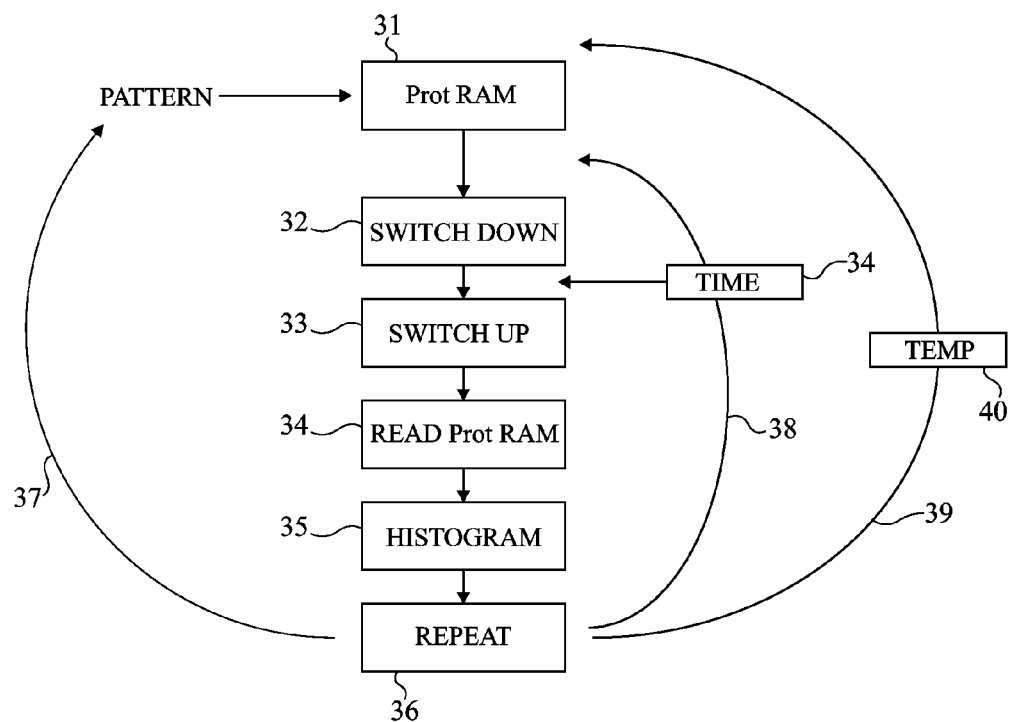
FIG. 2 is a simplified representation of an embodiment of a first phase of a method of protecting the content of a RAM according to an embodiment.

FIG. 2 is a block diagram illustrating an embodiment of a preparatory phase of a method of detecting a reset attack of the above-described type.

It determines a pattern which will then be stored in a non-volatile memory of the circuit to be transferred, at each initialization, into the volatile memory dedicated to the protection.

Thus, according to an embodiment, in a preparatory or training phase, a pattern is stored in a volatile memory (block 31, Prot RAM) dedicated to the protection or reference memory. In an embodiment, this memory 31 is different from the memory to be protected (12, FIG. 1). In an embodiment, the power supply of this memory 31 can be cut off/activated at will (for each verification). Indeed, memory 31 should be able to be switched down and back up independently from the volatile memory to be protected, which would otherwise lose its content each time a verification is performed. The preparatory phase may be carried out, for example, at the end of the memory manufacturing, or during a process of initialization of the implemented protection method, for example, to order, during the integrated circuit operation.

The circuit is then switched down (block 32, SWITCH DOWN), and then, after a short delay, switched back up (block 33, SWITCH UP). The delay between the switching down and up (power-off time) may be configurable (block 34, TIME) and may take different values. Typically, this delay is in the range from a few microseconds to a few seconds.

Once the circuit has been switched back up, the memory 12 content is read (block 34, READ Prot RAM). This reading is performed without having reset the memory. The reading aims at determining the number of memory cells which have switched state under the effect of the switching down/up. Rather than looking for the pattern stored in the memory, it is aimed at determining the effect of the switching down/up on the memory. The number of state switchings is stored (block 35, HISTOGRAM) and the process is repeated several times (block 36, REPEAT). This repeating aims at statistically determining the histogram of the number of state switchings on switching up of the memory 12.

The steps may be repeated for a plurality of patterns (arrow 37), for a plurality of time periods (arrow 38) and a plurality of temperatures (arrow 39 and block 40—TEMP). As a variation, they are also repeated for a plurality of power supply voltages.

To execute the process according to a plurality of patterns, it is returned to step 31 of storage into memory Prot RAM. To execute the process according to a plurality of power-off time periods, it is returned to switch-down step 32. To execute the process with a plurality of temperatures, it is returned before step 31 to try again with different patterns.

This training phase is, for a given pattern, used to determine in which statistical interval the number of state switchings after a switching down/up is located, for example, for different temperatures and different power-off time periods and different power supply voltages. According to an embodiment, the Hamming distance between the reference pattern and the current pattern is determined by combining their respective states by an XNOR-type comparison.

In an embodiment, one or a plurality of patterns and one or a plurality of power-off times periods which are most representative in terms of information relative to the circuit temperature are extracted from the training phase. In other words a pattern and a power-off time period for which the variation of the number of state switchings according to the circuit temperature is most significant are searched for. Thus, in operational phase, a switching down and up of the reference memory containing this pattern enables to assess the circuit temperature and, accordingly, the probability of being confronted to an attack.

Figure 3:
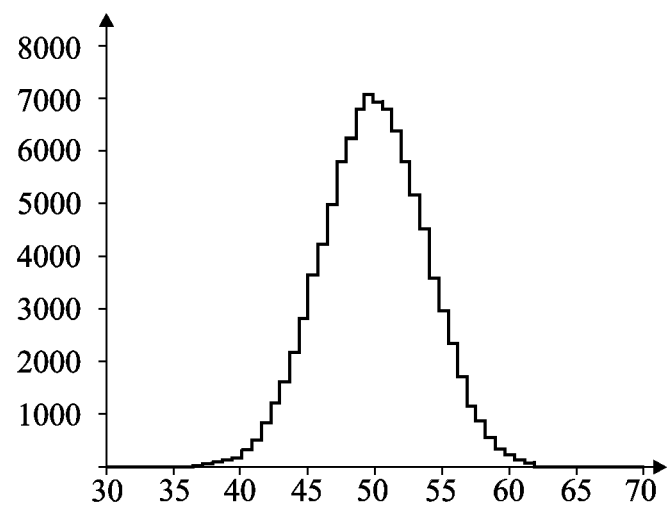
FIG. 3 illustrates an example of a histogram obtained by implementing the method of FIG. 2.

FIG. 3 is a histogram illustrating the implementation of the training phase described in relation with FIG. 2. This drawing illustrates an example of number of cells having switched states for a given pattern and temperature. This example discloses a Gaussian curve centered on 48%, staged between 40 and 60%. The histogram enables, for example, to set an interval of the number of state switchings which, if it is not respected during a verification in operational phase, means that there is a high risk of being confronted to an attack.

Once the pattern has been selected, it is stored in a non-volatile memory area of circuit 1. The protection RAM is configured so that it can be loaded with the pattern on each reset operation.

Figure 4:
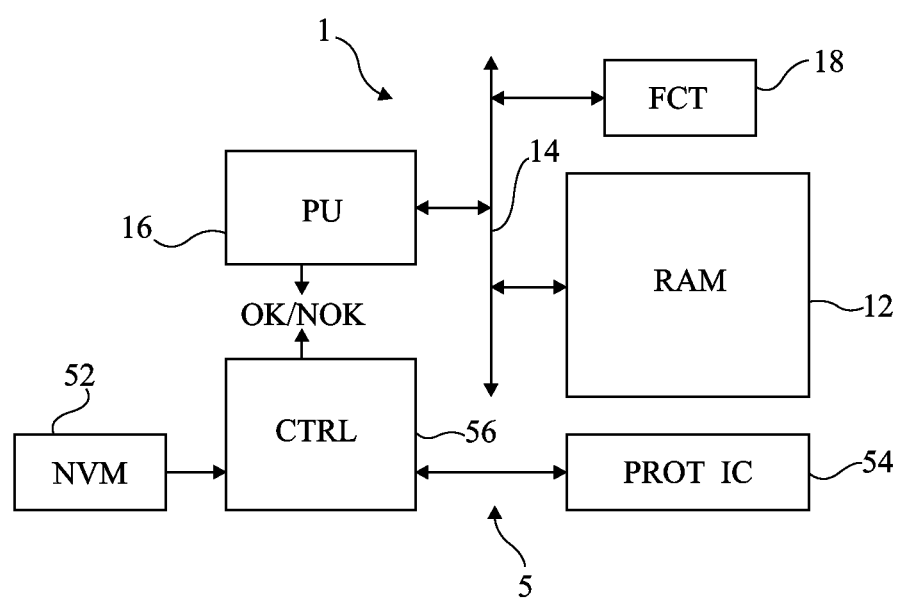
FIG. 4 is a block diagram of an embodiment of an integrated circuit provided with a circuit for detecting an attack by cooling and switching up.

FIG. 4 shows in the form of blocks an embodiment of an integrated circuit 1 provided with cold-boot attack detection circuits 5.

It comprises a processing unit 16, a volatile memory 12 to be protected, and one or a plurality of functions 18. Further, circuit 5 comprises a non-volatile memory 52 (NVM). This memory is not necessarily dedicated to the protection, and may be a memory used by the other circuit functions. It may accordingly, unlike what is shown, be connected to buses 14.

Detection circuit 5 comprises a protection circuit 54 (PROT IC), for example, according to an embodiment, a volatile memory (31, FIG. 2) dedicated to the protection or, according to an embodiment which will be described in relation with FIG. 7 and the following, a ring oscillator and a control circuit 56 (CTRL). Circuit 56 provides a detection result OK/NOK, for example, to processing unit 16, to take countermeasures (for example, a blocking of circuit 1) in the case where an attack is detected.

Control circuit 56 controls the transfer of the pattern stored in memory 52 to memory 54 each time the circuit is reset.

In the representation of FIG. 4, memories 52 and 54 have been illustrated as communicating with circuit 56 only. As a variation, they may be connected to buses 14 and, for memory 52, also be used for other functions.

Figure 5:
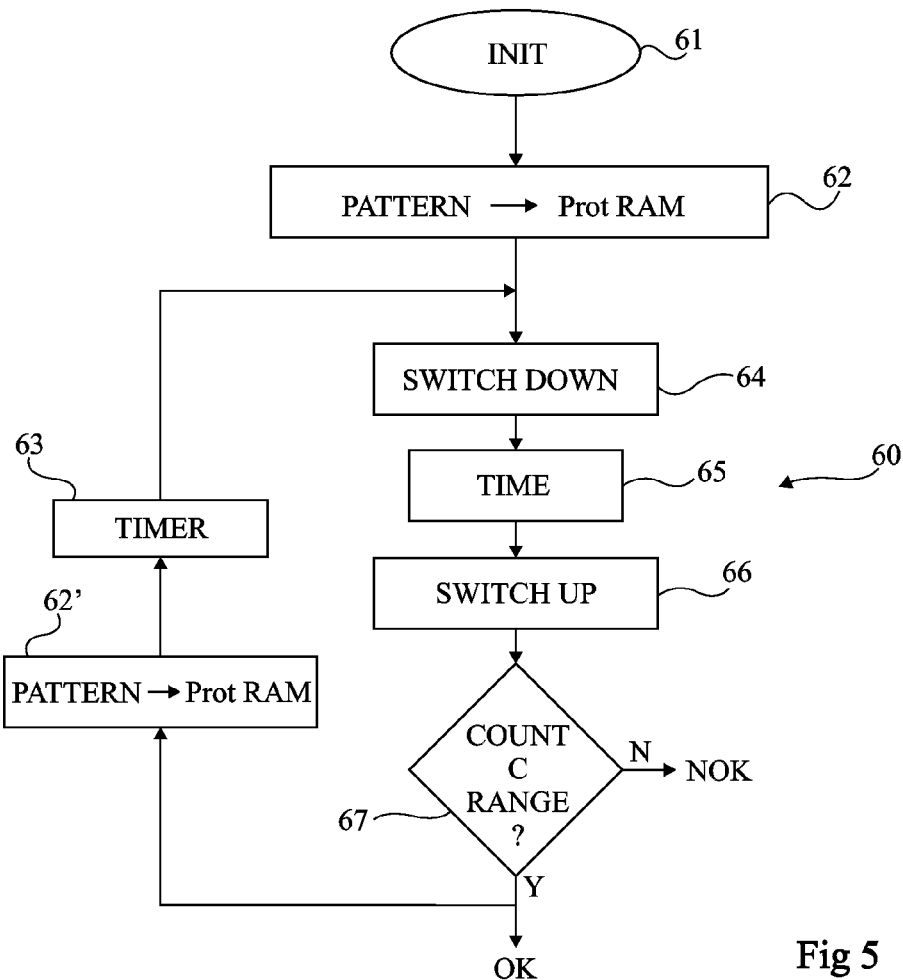
FIG. 5 is a simplified representation of an embodiment of a second phase of the protection method of FIG. 2.

FIG. 5 schematically shows in the form of blocks an embodiment of a cold-boot attack detection method.

For each initialization (block 61, INIT) or resetting of circuit 5, the pattern stored in memory 52 is transferred (block 62, PATTERN->Prot RAM) into protection memory 54.

Then, circuit 36 starts, periodically (loop illustrated by block 63, TIMER) in an embodiment, a verification procedure 60.

This procedure starts with a switching down (block 64, SWITCH DOWN), followed after a power-off time (block 65, TIME), by a switching up (block 66, SWITCH UP) of reference memory 54 (here, memory 31, FIG. 2). Circuit 56 (or, for example, unit 16 according to whether it is formed in hardware or software fashion) then causes a reading from the reference memory to count the number of cells having switched state and verifies whether this number is within the interval associated with the pattern (block 67, COUNT C RANGE?). Interval RANGE of authorized values is for example stored with the pattern in the non-volatile memory and is then read on each verification. If number COUNT is correct (output Y of block 67), the risk of being confronted to an attack is negligible and circuit 56 returns a state OK. The pattern is then reloaded into the reference memory from the non-volatile memory (block 62', PATTERN->Prot RAM) to be ready for the next verification.

If number COUNT is outside of the range (output N of block 67), this means a high probability of being confronted to an attack, that is, the circuit has been cooled since the last verification, and circuit 56 returns a state NOK.

According to an alternative embodiment, the characterization phase has enabled to determine a pattern which does not require being loaded, that is, in the authorized temperature range, the switching down/up of the reference memory provides a count COUNT remaining within the authorized range with no pattern reloading. In this case, step 62' is avoided.

The periodicity with which the test is performed is selected to be sufficiently short for the number of possible attacks by interruption between two tests to be insufficient for an attacker to discover the critical information.

According to the fineness desired in the detection, a plurality of patterns may be kept for different temperatures in the non-volatile memory and their respective responses. The pattern to be stored can then be selected according to the operating temperature of the circuit (which may be fitted with a temperature sensor) and the pattern can be updated, in the protection RAM, according to the operating temperature. Of course, this is done at the cost of a larger space in the non-volatile memory. As a specific embodiment, the pattern comprises from 8 to 64 bits.

Figure 6:
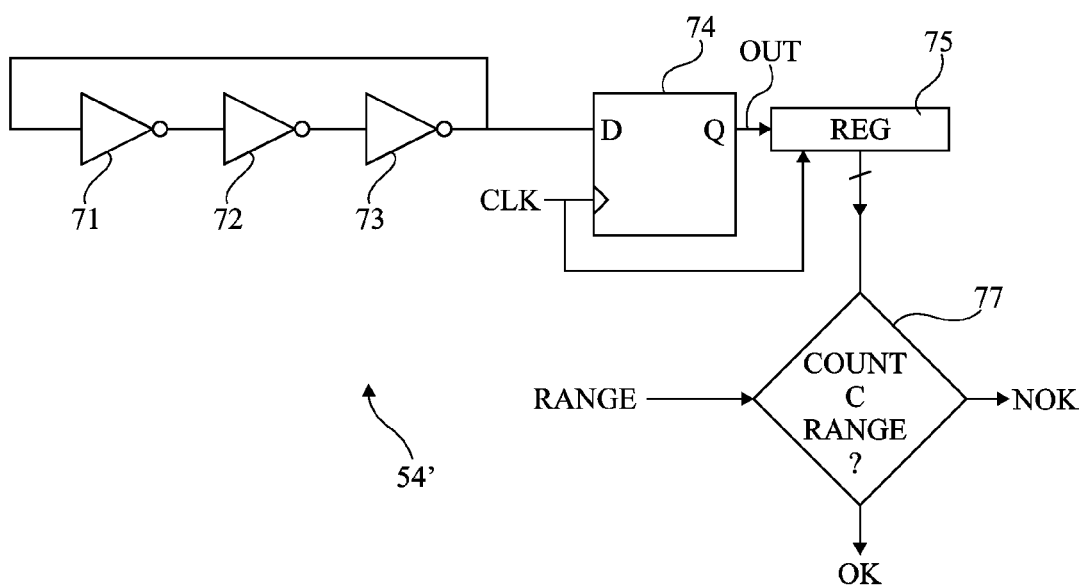
FIG. 6 schematically shows in the form of blocks an embodiment of an element of a detection circuit according to an embodiment.

FIG. 6 shows the electric diagram of an embodiment.

It is provided to integrate one or a plurality of ring oscillators in circuit 5. In the example of FIG. 6, the oscillator comprises three series-connected inverters 71, 72, and 73, the output of last inverter 73 being looped back on the input of the first one, 71, and being connected to a data input D of a D flip-flop 74. The clock input of flip-flop 74 receives a clock signal CLK and its output, for example, its direct output Q, provides a detection signal OUT. Actually, the sampling performed by the D flip-flop provides a succession of states at the rate of clock CLK. As a variation, the clock input of the flip-flop is driven by a ring oscillator different from oscillator 54'.

Signal OUT is interpreted to determine its variation relative to a reference signal in an authorized operating temperature range.

For example, signal OUT is sent to the input of a shift register 75 (REG) at the rate of clock CLK, storing a result originating from the previous outputs of the ring oscillator. Each time a verification is needed (on each attack detection test), it is verified (block 77, COUNT C RANGE?) whether the number of states "1" (or the number of states "0") in register 75 is within an authorized range RANGE.

Indeed, the response of the ring oscillator varies according to temperature, which influences the thermal noise of the transistors, which conditions the state switchings at input D of flip-flop 74.

As in the case of a reference volatile memory described hereabove, the statistical response (that is, the state of the output bit of flip-flop 74 or, more specifically, the number of "0s" or of "1s" in register 75) is determined at different temperatures, in a training phase, to determine the majority output taken on switching up. Interval RANGE with which the response of circuit 54' is to be compared is, as in the embodiment based on a dedicated memory, stored in non-volatile memory 32.

As compared with the embodiment of FIG. 2, no pattern is here to be selected. The pattern can be considered as being "native" in a way and stored in hardware fashion by the ring oscillator. To improve the statistical effect, a plurality of ring oscillators in parallel, having their outputs combined (for example, by XOR) may be provided, flip-flop 74 receiving the result of this combination.

FIGS. 7A, 7B, 7C, 8A, 8B, 8C illustrate the circuit operation according to an embodiment, respectively in "normal" operation (FIGS. 7A to 7C) and in the presence of an attack by cooling of the circuit (FIGS. 8A to 8C). FIGS. 7A and 8A illustrate examples of the shape of the signal at the D input of flip-flop 74. FIGS. 7B and 8B illustrate corresponding examples of clock signal CLK. FIGS. 7C and 8C illustrate corresponding examples of output signal Q of flip-flop 74, and thus of the content of register 75.

In the normal operating range of the circuit, the oscillations have a given shape (arbitrary). In the presence of a cold-boot attack, the shape of the oscillations of the ring oscillator is altered. As to the clock signal, assuming that the clock is stable, the cooling results in modifying the frequency, but not the duty cycle. Thus, the signal at the output of flip-flop 75 has another shape than when there is no attack.

As a variation, a circuit of another nature is integrated to play the role of circuit 54'. For example, an integrated circuit for which the statistical response of an output signal is different, when it is submitted to repeated switching down/up operations with a cooling, from the response during a stable operation.

Specific embodiments have been described. Various alterations, modifications, and improvements will readily occur to those skilled in the art. In particular, the practical implementation of the described embodiments is within the abilities of those skilled in the art based on the functional indications given hereabove.

Such alterations, modifications, and improvements are intended to be part of this disclosure, and are intended to be within the spirit and the scope of the present disclosure. Accordingly, the foregoing description is by way of example only and is not intended to be limiting.

Some embodiments may take the form of or include computer program products. For example, according to one embodiment there is provided a computer readable medium including a computer program adapted to perform one or more of the methods or functions described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some of the systems and/or modules and/or circuits and/or blocks may be implemented or provided in other manners, such as at least partially in firmware and/or hardware, including, but not limited to, one or more application-specific integrated circuits (ASICs), digital signal processors, discrete circuitry, logic gates, shift registers, standard integrated circuits, state machines, look-up tables, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   transferring, into a first volatile memory of an integrated circuit, a pattern stored in a non-volatile memory of the integrated circuit; and
   periodically,
      switching down and switching up the first volatile memory;
      generating an indication of a number of switched bits in the first volatile memory;

comparing the indication of the number of switched bits to one or more thresholds indicative of whether a cold-boot attack is occurring; and detecting an occurrence of a cold-boot attack based on the comparison of the indication of the number of switched bits to the one or more thresholds indicative of whether a cold-boot attack is occurring.

2. The method of claim 1 wherein the pattern is reloaded into the first volatile memory before each switching down.

3. The method of claim 1 wherein the pattern is selected so that said number of bits which switch state varies according to the integrated circuit temperature.

4. The method of claim 1 wherein the one or more thresholds define a range of values and the detecting the cold-boot attack comprises determining whether the indication of the number of switched bits is within the range of values.

5. The method of claim 4 wherein said range of values is determined by statistical analysis of states taken by the bits of the first volatile memory in successive switch up operations during a training phase.

6. The method of claim 1 wherein the generating the indication of the number of switched bits comprises counting at least one of:
a number of bits in a first state; and
a number of bits in a second state different from the first state.

7. The method of claim 6 wherein the comparing the indication of the number of switched bits to one or more thresholds comprises at least one of:
comparing the number of bits in the first state to one or more threshold values; and
comparing the number of bits in the second state to one or more threshold values.

8. The method of claim 1 wherein the integrated circuit comprises a second volatile memory separate from the first volatile memory and the first volatile memory is switched up and switched down independent of the second volatile memory.

9. The method of claim 1, comprising:
implementing one or more countermeasures in response to detection of a cold-boot attack.

10. A device, comprising:
a first volatile memory;
a non-volatile memory; and
cold-boot detection circuitry configured to:
transfer a pattern stored in the non-volatile memory to the first volatile memory; and
periodically,
switch down and switch up the first volatile memory;
generate an indication of a number of switched bits in the first volatile memory;
compare the indication of the number of switched bits to one or more thresholds indicative of whether a cold-boot attack is occurring; and
detect a cold-boot attack based on the comparison of the indication of the number of switched bits to the one or more thresholds indicative of whether a cold-boot attack is occurring.

11. The device of claim 10 wherein the pattern is reloaded into the first volatile memory before each switching down.

12. The device of claim 10 wherein the pattern is selected so that said number of bits which switch state is an indication of a temperature of the device.

13. The device of claim 10 wherein the cold-boot attack detection circuitry is configured to determine whether the indication of the number of switched bits is within a range of values.

14. The device of claim 13 wherein the range of values is determined by statistical analysis of states taken by the bits of the first volatile memory in successive switch up operations during a training phase.

15. The device of claim 10 wherein the cold-boot detection circuitry comprises a counter.

16. The device of claim 15 wherein the cold-boot detection circuitry is configured to count at least one of:
a number of bits in a first state; and
a number of bits in a second state different from the first state.

17. The device of claim 10, comprising an integrated circuit including the first volatile memory, the non-volatile memory and the cold-boot detection circuitry.

18. The device of claim 17 wherein the integrated circuit includes a second volatile memory different from the first volatile memory and the second volatile memory is configured to, in operation, store protected data.

19. The device of claim 10, comprising:
a second volatile memory separate from the first volatile memory, wherein the cold-boot detection circuitry switches down and switches up the first volatile memory independent of the second volatile memory.

20. The device of claim 10 wherein the cold-boot detection circuitry implements one or more countermeasures in response to detection of a cold-boot attack.

21. A system, comprising:
a processing unit;
a first volatile memory;
a non-volatile memory; and
cold-boot detection circuitry configured to:
transfer a pattern stored in the non-volatile memory to the first volatile memory; and
periodically,
switch down and switch up the first volatile memory;
generate an indication of a number of switched bits in the first volatile memory;
compare the indication of the number of switch bits to one or more thresholds indicative of whether a cold-boot attack is occurring; and
detect a cold-boot attack based on the comparison of the indication of the number of switched bits to the one or more thresholds indicative of whether a cold-boot attack is occurring.

22. The system of claim 21 wherein the cold-boot attack detection circuitry is configured to determine whether the indication of the number of switched bits is within a range of values.

23. The system of claim 22 wherein the range of values is determined by statistical analysis of states taken by the bits of the first volatile memory in successive switch up operations during a training phase.

24. The system of claim 21 wherein the cold-boot detection circuitry comprises a counter.

25. The system of claim 21, comprising an integrated circuit including the first volatile memory, the non-volatile memory and the cold-boot detection circuitry.

26. The system of claim 25 wherein the integrated circuit includes a second volatile memory different from the first volatile memory.

* * * * *